US011204337B2

(12) United States Patent
Ridgeway (10) Patent No.: US 11,204,337 B2
(45) Date of Patent: Dec. 21, 2021

(54) SEPARATION OF IONS ACCORDING TO ION MOBILITY WITH ENHANCED RESOLVING POWER FOR MASS SPECTROMETRIC ANALYSIS (71) Applicant: Bruker Scientific LLC, Billerica, MA (US)

(72) Inventor: Mark Ridgeway, Stow, MA (US)

(*) Notice: Subject to any disclaimer, the term of this patent is extended or adjusted under 35 U.S.C. 154(b) by 0 days.

(21) Appl. No.: 16/426,662

(22) Filed: May 30, 2019

(65) Prior Publication Data
US 2019/0369049 A1 Dec. 5, 2019

Related U.S. Application Data (60) Provisional application No. 62/680,023, filed on Jun. 4, 2018.

(51) Int. Cl.
*G01N 27/62* (2021.01)
*H01J 49/04* (2006.01)
(Continued)

(52) U.S. Cl.
CPC ........ *G01N 27/622* (2013.01); *H01J 49/0031* (2013.01); *H01J 49/0422* (2013.01); *H01J 49/40* (2013.01)

(58) Field of Classification Search
CPC ...... H01J 49/031; H01J 49/0422; H01J 49/40; G01N 27/622
See application file for complete search history.

(56) References Cited

U.S. PATENT DOCUMENTS 5,847,386 A * 12/1998 Thomson ............... H01J 49/005
250/288
5,905,258 A 5/1999 Clemmer et al.
(Continued)

FOREIGN PATENT DOCUMENTS

CN 1271462 C 8/2006
CN 203798779 U 8/2014
(Continued)

OTHER PUBLICATIONS

Ridgeway, Mark et al., "Trapped ion mobility spectrometry: A short review", International Journal of Mass Spectrometry, Elsevier Science Publishers, Amsterdam, NL, Jan. 9, 2018 pp. 22-35.
(Continued)

*Primary Examiner* — Sean M Luck
(74) *Attorney, Agent, or Firm* — Benoit & Côté Inc.

(57) ABSTRACT

The invention relates to a method for targeted analysis of ions according to mobility which uses a trapping ion mobility separator (TIMS) comprising a gas flow and an electric DC field barrier within an RF ion guide. The method comprises the steps of introducing ions into the trapping ion mobility separator, pushing the ions by the gas flow against the counteracting electric DC field barrier wherein the height of the electric DC field barrier and the velocity of the gas flow are set such that target ions are trapped near a plateau of the trapping ion mobility separator along which the effective force acting on the ions is substantially constant, and adjusting the height of the electric DC field barrier and/or the velocity of the gas flow in a single step such that the target ions pass the electric DC field barrier.

22 Claims, 5 Drawing Sheets

(51) Int. Cl.
  *H01J 49/40*     (2006.01)
  *G01N 27/622*    (2021.01)
  *H01J 49/00*     (2006.01)

(56) References Cited

U.S. PATENT DOCUMENTS

| | | | |
|---|---|---|---|
| 7,838,826 | B1 | 11/2010 | Park |
| 8,766,176 | B2 | 7/2014 | Park et al. |
| 9,304,106 | B1* | 4/2016 | Park .................... G01N 27/622 |
| 9,546,980 | B1* | 1/2017 | Rather .................. G01N 27/622 |
| 9,741,552 | B2 | 8/2017 | Park et al. |
| 9,891,194 | B2 | 2/2018 | Mann et al. |
| 10,060,879 | B2 | 8/2018 | Silveira |
| 2002/0014586 | A1* | 2/2002 | Clemmer ............. G01N 27/622 250/287 |
| 2002/0070339 | A1 | 6/2002 | Clemmer |
| 2009/0294644 | A1* | 12/2009 | Belov .................. H01J 49/066 250/282 |
| 2012/0273670 | A1* | 11/2012 | Park .................... G01N 27/626 250/282 |
| 2012/0273673 | A1* | 11/2012 | Park ...................... H01J 49/06 250/283 |
| 2012/0286156 | A1 | 11/2012 | Park |
| 2014/0264002 | A1 | 9/2014 | Goedecke |
| 2016/0231275 | A1* | 8/2016 | Park .................... H01J 49/0031 |
| 2017/0122906 | A1* | 5/2017 | Mann .................. H01J 49/0031 |
| 2017/0125234 | A1* | 5/2017 | Rather .................. H01J 49/421 |
| 2017/0178887 | A1* | 6/2017 | Park .................... H01J 49/4225 |
| 2017/0241951 | A1* | 8/2017 | Clark ................... H01J 49/005 |
| 2017/0350861 | A1* | 12/2017 | Harder .................. H01J 49/004 |
| 2018/0340910 | A1* | 11/2018 | Betz ...................... G01N 27/622 |

FOREIGN PATENT DOCUMENTS

| | | |
|---|---|---|
| CN | 105738463 A | 5/2016 |
| CN | 107068533 B | 8/2017 |
| EP | 3165913 A1 | 5/2017 |

OTHER PUBLICATIONS

Michelmann, Karsten et al., "Fundamentals of Trapped Ion Mobility Spectrometry" Journal of the American Society for Mass Spectrometry, Elsevier Science Inc. US, vol. 26 No. 1, Oct. 21, 2014, pp. 14-24.

Ridgeway, Mark et al., "Trends in trapped ion mobility—Mass spectrometry instrumentation", TRAC Trends in Analytical Chemistry, vol. 116, Apr. 6, 2019, pp. 324-331.

Ridgeway, Mark et al., "Gated trapped ion 1-15 mobility spectrometry coupled to fourier transform ion cyclotron resonance mass spectrometry", International Journal for Ion Mobility Spectrometry, Springer DE, vol. 19, No. 2, Mar. 29, 2016.

\* cited by examiner

FIGURE 7B

SEPARATION OF IONS ACCORDING TO ION MOBILITY WITH ENHANCED RESOLVING POWER FOR MASS SPECTROMETRIC ANALYSIS

BACKGROUND OF THE INVENTION

Field of the Invention

The invention relates to methods and devices for separating ions according to ion mobility using a trapping ion mobility separator (TIMS) which preferably applies a gas flow to push ions against an electric DC field barrier. The ions separated according to ion mobility are often detected by a downstream mass analyzer or tandem mass analyzer.

Description of the Related Art

Mass spectrometers can only determine the ratio of the ion mass to the charge of the ion. Where the terms "mass of an ion" or "ion mass" are used below for simplification, they always refer to the ratio of the mass m to the dimensionless number z of elementary charges of the ion. This charge-related mass m/z has the physical dimension of a mass; it is often also called "mass-to-charge ratio", although this is incorrect with regard to physical dimensions. "Ion species" shall denote ions having the same elemental composition, the same charge, and the same three-dimensional structure. The ion species generally comprises all the ions of an isotope group, which consist of ions of slightly different masses, but virtually the same mobilities.

Isomers are molecules with the same empirical formula, i.e., the same elemental composition, having different geometrical shapes but exactly the same mass. Different kinds of isomers are known for bioorganic molecules: isomers related to the primary structure (structural isomers) and isomers related to the secondary or tertiary structure (conformational isomers). It is impossible to differentiate between isomers on the basis of their mass. Some information as to the structure can be obtained from fragment ion mass spectra; however, an efficient and certain way to recognize and distinguish such isomers is to separate their ions according to their different mobilities. Isomers represent one type of species that may be separated using high resolution ion mobility analyzers. Other types of ions with similar mobility may have different masses, sometimes only slightly different.

There are different types of low-pressure ion mobility spectrometers/analyzers capable of being combined with mass spectrometry. Two decades ago, the mobility of ions was commonly measured via their drift velocities in a stationary gas under the influence of an electric DC field, being constant in time and uniform in space. In most cases, the drift regions are filled with an inert gas such as helium, nitrogen or argon. The ions of the substance under investigation are pulled through the gas by means of the electric DC field, which is produced by suitable DC potentials applied to ring electrodes arranged along the drift region. The friction with the gas results in a constant drift velocity $v_d$ for each ion species which is proportional to the electric field strength E, which can be represented as: $v_d = K \times E$. The proportionality factor K is called the "ion mobility coefficient" (or simply "ion mobility") of the ion species. The ion mobility K is a function of gas temperature, gas pressure, type of gas, ion charge, and, in particular, the collision cross-section of the ions.

Isomeric ions with the same charge-related mass m/z but different collision cross-section have different ion mobilities in a gas of the same temperature, pressure and type. Isomers of the smallest geometric dimension possess the greatest mobility and therefore the highest drift velocity $v_d$ through the gas. Unfolded protein ions undergo more collisions than tightly folded proteins. Protein ions which are unfolded or partially folded therefore arrive at the end of the drift region later than strongly folded ions of the same mass. But structural isomers, for example proteins with glycosyl, lipid or phosphoryl groups at different sites, also have different collision cross-sections. The ion mobilities of structural isomers sometimes differ by only extremely small values, and can be hard to distinguish.

The mobility resolving power ("mobility resolution" for short) is defined as $R_{mob} = K/\Delta K = v_d/\Delta v_d$, where $\Delta K$ is the width of the ion signal of the mobility K at half height, measured in units of ion mobility, and $\Delta v_d$ is the correspondent difference in speed. The mobility resolution $R_{mob}$ is influenced predominantly by the diffusion broadening of the ion clouds, especially for long drift regions and high electric field strengths; all other influences, such as the space charge, tend to be negligibly small. The part of the mobility resolution $R_d$ determined by the diffusion broadening is given by the equation:

$$R_d = \sqrt{\frac{zeEL_d}{16\,kT\ln 2}}$$

where z is the number of elementary charges e, E the electric field strength, $L_d$ the length of the drift region, k the Boltzmann constant and T the temperature of the gas in the drift region. A high mobility resolution for an ion with a given number z of elementary charges e can thus only be achieved by means of a high field strength E, a long drift region $L_d$, or a low temperature T.

Typically, the length of the drift region in prior art analyzers was chosen to be between 80 centimeters and four meters. An ion mobility resolution of $R_{mob} = 100$ was regarded as "high mobility resolution", achieved only with long drift tubes.

In U.S. Pat. No. 7,838,826 B1 (M. A. Park, 2008), an ion mobility spectrometer is presented, the size of which amounts to about ten centimeters only. The spectrometer has become widely known under the name TIMS (Trapped Ion Mobility Spectrometer/Separator). It is commonly based on a moving gas driving ions against and over a counteracting electric DC field barrier in a modified RF ion funnel, quite suitable to being incorporated into a time-of-flight mass spectrometer. Unlike many other trials to build small ion mobility spectrometers, the device by M. A. Park has already achieved ion mobility resolutions in excess of several hundreds, mainly because it uses higher electric field strengths, E, and longer effective path lengths, L.

The basic operation of the TIMS instrument, and different operational modes using non-linear scans with changing scan speeds are described in some detail in U.S. Pat. No. 8,766,176 B2 (Acquisition Modes for Ion Mobility Spectrometers using Trapped Ions; M. A. Park et al), which is incorporated herein by reference. Among the different modes disclosed is a temporal zoom mode, which involves starting the mobility scan at a high speed, lowering the scan speed in a predefined region to achieve a high ion mobility resolution for a selected mobility range, and resuming a high speed again for the rest of the mobility range to save acquisition time. A mobility resolution in excess of $R_{mob}=400$ has been achieved within the zoom regions with this small apparatus.

Without any temporal zoom, the instrument measures wide ranges of analytes without preferring specific mass ranges or ion mobility ranges. The application of the temporal zoom mode, instead, requires previous knowledge of the region of interest within the ion mobility spectrum. Such an analysis method is called a targeted method, focused on one or more target ion species with ion mobilities that are close in value and known mass. At present, such targeted analysis methods gain considerably in importance in many application fields, e.g., in quality control for the production of organic molecules, particularly in pharmaceutics, or in the field of clinical diagnostics, e.g., for cancer analysis by biomarkers.

There is an increasing demand for targeted methods to separate ion species having only slightly different ion mobilities. In most cases, the ion species are rather small molecules, usually stable in their folding conformation, and differing only by the position of a small chemical group. Ion mobility resolutions in access of $R_{mob}=400$ may be required. Quite often, the method is a routine analysis to measure just the relation of two ion species in a sample having nearly the same mobility.

High-resolution time-of-flight mass spectrometers with orthogonal injection of the ions (OTOF-MS) have proven successful for combinations of mobility spectrometers with mass spectrometers. Particularly, OTOF-MS with quadrupole separators (Q-OTOF-MS) and fragmentation cells for the acquisition of fragment ion mass spectra are used here. But a variety of other types of mass analyzers may also been used in combination with TIMS.

SUMMARY OF THE INVENTION

In a first aspect, the invention provides a method for analyzing ions according to mobility using a trapping ion mobility separator (TIMS) which comprises a gas flow and a counteracting electric DC field barrier both of which are located in an RF ion guide. The method comprises: introducing ions into the trapping ion mobility separator; pushing the ions by the gas flow against the counteracting electric DC field barrier wherein the height of the electric DC field barrier and the velocity of the gas flow are set such that target ions are trapped near a plateau of the trapping ion mobility separator along which the effective force acting on the ions is substantially constant, and adjusting the height of the electric DC field barrier and/or the velocity of the gas flow in a single step such that the target ions pass the electric DC field barrier.

The effective force acting on the ions is generated by the friction force of the gas flow and the electric DC field. The target ions are a true subset of all ions introduced and trapped at the electric DC field barrier, i.e., not all trapped ions can pass the electric DC field barrier after the adjusting step. The trapped ions, including the target ions, are radially confined by an electric RF field.

Prior to the adjusting step, the length of the plateau is preferably more than 30% of the length of the electric DC field barrier, in particular more than 50% of the length of the electric DC field barrier. The plateau is preferably longer than 1 cm, more preferably longer than 3 cm, in particular longer than 5 cm.

The mobility range $(K_{max}-K_{min})/K$ of the target ions is preferably smaller than $1/100$ and, in particular, smaller than $1/1000$, wherein $K_{max}$ is the maximum mobility, $K_{min}$ the minimum mobility and K the average mobility of the target ions. The height of the electric DC field barrier and the velocity of the gas flow is changed by less than $1/100$ and, in particular, less than $1/1000$, compared to the height and the velocity prior to the adjusting step. The duration needed for adjusting the height of the electric DC field barrier and/or the velocity of the gas flow is preferably less than 0.1 ms and, in particular, less than 0.01 ms, or even less than 0.001 ms.

The gradient of the electric DC field at the trapping position of the target ions near the plateau of the electric DC field barrier is preferably lower than the gradient at the upstream positions of the electric DC field barrier in order to reduce space charge effects on the target ions.

The method preferably comprises that the introduction of ions is stopped prior to the adjusting step. Those ions which are not trapped prior to the adjusting step can be de-charged, quenched or deflected downstream of the electric DC field barrier.

In one embodiment, the method further comprises separating the target ions according to mobility in time and selecting a subset of the separated target ions by switching an ion gate while the subset passes the ion gate, said ion gate being located downstream of the electric DC field barrier. The term "while" in this sense includes that the transmission of the ion gate can be switched after the subset of ions has passed or during the time that the ions of the subset are passing the ion gate. The selected target ions preferably arrive at the ion gate prior to the unselected target ions.

The target ions are preferably separated according to mobility in time along the plateau at which a reduced, substantially constant effective force acts on the target ions after the adjusting step. The steps of introducing, trapping, adjusting, separating and selecting can be repeated and the repeatedly selected target ions are stored in an ion trap located downstream of the ion gate. The repeatedly selected and stored ions can further be analyzed by acquiring a mass spectrum and/or at least one fragment mass spectrum. The separated and selected target ions can also be directly analyzed by acquiring a mass spectrum and/or at least one fragment mass spectrum without repeated storage in an ion trap.

In another embodiment, the method further comprises separating the target ions according to mobility in time along the plateau with a reduced, substantially constant effective force and selecting a subset of the separated target ions by re-adjusting the height of the electric DC field barrier and/or the velocity of the gas flow while the ions of the subset pass the end of the plateau. The selected target ions arrive at the end of the plateau prior to the unselected target ions.

A subset of the target ions can be selected by switching an ion gate or by re-adjusting the height of the electric DC field barrier and/or the velocity of the gas flow. The steps of introducing, trapping, adjusting, separating, selecting and acquiring a mass spectrum and/or at least one fragment mass spectrum can be rerun for different target ions in order to cover a broader mobility range. The acquired mass spectra and/or fragment mass spectra can be combined into an array to yield a combined ion mobility mass spectrum. The selected target ions can further be repeatedly stored prior to acquiring the mass spectra and/or fragment mass spectra.

In a second aspect, the invention provides a mass spectrometric system comprising: an ion source; a trapping ion mobility separator (TIMS) comprising a gas flow and a counteracting electric DC field barrier both of which are located inside an RF ion guide; and a mass analyzer. The system further comprises means for step-wise adjustment of the height of the electric DC field barrier and/or the velocity of the gas flow, and the electric DC field barrier comprises a plateau along which the effective force acting on the ions is substantially constant.

The length of the plateau is preferably more than 30% of the length of the electric DC field barrier, in particular more than 50% of the length of the electric DC field barrier. The plateau is preferably longer than 1 cm, more preferably longer than 3 cm and, in particular, longer than 5 cm.

The system can further comprise an ion gate located between the TIMS and the mass analyzer. Preferably, the system further comprises a fragmentation cell located between the ion gate and the mass analyzer and/or an ion trap between the ion gate and the mass analyzer, in particular between the ion gate and the fragmentation cell. Any ion gate can be used, e.g., a Bradbury-Nielsen gate, Tyndal gate or a deflecting ion optic. The ion gate is preferably a storing gate, capable of storing the ions for later analysis by the mass spectrometer. In addition, a mass filter can be located between the ion gate and the fragmentation cell, in particular between the ion trap and the fragmentation cell.

The mass analyzer is preferably one of a quadrupole mass filter, a time-of-flight mass analyzer, a time-of-flight mass analyzer with orthogonal ion injection, a RF ion trap, a DC ion trap (like an orbitrap or cassini-trap) and an ion-cyclotron-resonance trap.

In a third aspect, the invention provides a method for analyzing ions according to mobility using a trapping ion mobility separator (TIMS) comprising a gas flow and a counteracting electric DC field, wherein the effective force induced by the gas flow and the electric DC field has a gradient along the axis in a first region (ramp) of the TIMS and is substantially constant along a second downstream region of the TIMS (plateau). The method comprises the steps of introducing ions into the TIMS wherein the strength of the electric DC field and the velocity of the gas flow are set such that target ions are axially trapped near the plateau, and adjusting the strength of the electric DC field and/or the velocity of the gas flow in a single step such that the target ions are no longer trapped near the plateau and pass the trapping ion mobility separator. The trapped target ions are radially confined by an electric RF field. The target ions and other ions are axially trapped at the ramp at positions depending on their mobility wherein the effective force is zero at the corresponding trapping positions. Due to the adjustment of the strength of the electric DC field and/or the velocity of the gas flow, the effective force acting on the target ions becomes greater than zero in the TIMS and the target ions can pass the TIMS.

Prior to the adjusting step, the length of the plateau is preferably more than 30% of the length of the TIMS, in particular more than 50% of the length of the TIMS. The plateau is preferably longer than 1 cm, more preferably longer than 3 cm and, in particular, longer than 5 cm.

The mobility range $(K_{max}-K_{min})/K$ of the target ions is preferably smaller than $1/100$ and, in particular, smaller than $1/1000$, wherein $K_{max}$ is the maximum mobility, $K_{min}$ the minimum mobility and K the average mobility of the target ions. The duration needed for adjusting the height of the electric DC field barrier and/or the velocity of the gas flow is preferably less than 0.1 ms, in particular less than 0.01 ms or even less than 0.001 ms.

In one embodiment, the method further comprises separating the target ions according to mobility in time and selecting a subset of the separated target ions by switching an ion gate while the subset passes the ion gate, said ion gate being located downstream of the electric DC field barrier. The term "while" in this context includes that the transmission of the ion gate can be switched after the ion subset has passed or during the time that ions of the subset pass the ion gate. The selected target ions preferably arrive at the ion gate prior to the unselected target ions.

The target ions are preferably separated according to mobility in time along the plateau at which a reduced, substantially constant effective force acts on the target ions after the adjusting step. The steps of introducing, trapping, adjusting, separating and selecting can be repeated and the repeatedly selected target ions are stored in an ion trap located downstream of the ion gate. The repeatedly selected and stored ions can further be analyzed by acquiring a mass spectrum and/or at least one fragment mass spectrum. The separated and selected target ions can also be directly analyzed by acquiring a mass spectrum and/or at least one fragment mass spectrum without repeated storage in an ion trap.

A subset of the target ions can be selected by switching an ion gate or by re-adjusting the height of the electric DC field barrier and/or the velocity of the gas flow. The steps of introducing, trapping, adjusting, separating, selecting and acquiring a mass spectrum and/or at least one fragment mass spectrum can be rerun for different target ions in order to cover a broader mobility range. The acquired mass spectra and/or fragment mass spectra can be combined into an array to yield a combined ion mobility mass spectrum. The selected target ions can further be repeatedly stored prior to acquiring the mass spectra and/or fragment mass spectra.

In another embodiment, the method further comprises separating the target ions according to mobility in time along the plateau with a reduced, substantially constant effective force and selecting a subset of the separated target ions by re-adjusting the strength of the electric DC field and/or the velocity of the gas flow while the ions of the subset pass the end of the plateau. The selected target ions arrive at the end of the plateau prior to the unselected target ions.

BRIEF DESCRIPTION OF THE DRAWINGS

The invention can be better understood by referring to the following figures. The elements in the figures are not necessarily to scale, emphasis instead being placed upon illustrating the principles of the invention (often schematically):

FIG. 1 shows a common operation of a trapped ion mobility separator (TIMS). Entrained by a gas (7), ions from an electrospray ion source (not shown) are introduced via capillary (8) into the first chamber of a vacuum system. A repeller plate (9) drives the ions (6) into the entrance RF funnel (10) of the TIMS. The entrance RF funnel (10) guides the ions into the tube (11) forming a quadrupolar RF tunnel. The quadrupolar RF tunnel (11) comprises a stack of thin electrodes with central holes which form a circular tube arranged around the z-axis of the device. The thin electrodes are separated by insulating material closing the gaps between the electrodes around the tube enabling the creation of a DC electric field profile inside the tube (11). The electrodes of the quadrupolar RF tunnel (11) are segmented into quadrants (1, 2, 3, 4), to allow for the generation of a radial quadrupolar electric RF field inside, keeping the ions near to the axis. Inside the quadrupolar RF tunnel (11), the ions are blown by the gas flow (14) against the ramp of an axial electric DC field barrier. In the bottom part of FIG. 1, two phases A and B of the profile of the electric DC field barrier are shown. The arrows (16) symbolically show the gas flow, driving the ions through the device and up the ramp of the electric DC field barrier; the strength of the gas flow corresponds to the maximum gas flow of the gas flow profile (14). The operation starts with an "ion accumulation phase" (field diagram A). The ions are blown by the gas flow against the ramp of the electric DC field barrier and are stopped there because they cannot surmount the electric DC field barrier. The ions are accumulated on the rising edge of the electric field between locations (20) and (23), where ions of low mobility (mainly heavy ions of large collision cross section) are collected in the high field near the upper end of the ramp, whereas ions of high mobility gather in the low field near the foot of the ramp, as indicated by the size of the dots symbolizing the size of the ions inside the ion clouds. In a second phase (field diagram B), the "scan phase", the supply voltage for the electric DC field barrier is steadily decreased, and ions of increasing mobility can escape successively towards an ion detector, particularly to a mass spectrometer operating as ion detector.

FIG. 4 illustrates a preferred electric DC field profile of the TIMS. In diagram E, the plateau of the electric DC field barrier between locations (33) and (34) is elongated (compared with the plateau in FIGS. 1 and 3), and the part of ramp directly before the plateau between locations (31) and (33) is made very flat. The two target ion species (36) and (38) with ions of identical mass but slightly different ion mobilities are stored on this flat part of the ramp of the electric DC field barrier. Diagram F presents the state of the ion movement a moment after the height of the electric DC field barrier has been somewhat lowered to release the target ion species (36) and (38). The ions of target ion species (38) have a slightly lower mobility, they move in front of the target ion species (36) because of a better start position and a slightly higher friction within the gas flow, symbolically indicated by the arrows (16).

FIG. 6 presents an embodiment for a storing ion gate, comprising a short RF quadrupole system (41) enclosed by two apertured ring electrodes (40) and (42). A cross section (44) of the gate is shown on the left of FIG. 6. Two target ion species (ion clouds) (36) and (38) are just passing the gate, not yet hindered by any DC potential at the ring electrodes. In the moment when the first ion cloud (38) is leaving the gate, DC potentials at the ring electrodes are switched on to keep the second ion cloud (36) inside the gate. In the bottom part of the figure, the potential along the axis z of the storing ion gate is presented, keeping the ion cloud (36) within the storing gate. After finishing the analysis of cloud (38) in the mass spectrometer, the ion cloud (36) may be sent into the mass spectrometer by applying suitable potentials to the ring electrodes.

DETAILED DESCRIPTION

While the invention has been shown and described with reference to a number of different embodiments thereof, it will be recognized by those skilled in the art that various changes in form and detail may be made herein without departing from the scope of the invention as defined by the appended claims.

The present invention provides new methods for a targeted analysis which achieve ultrahigh ion mobility resolution in a limited region of the full ion mobility range or spectrum, respectively. At least some of these new methods require modifications of the instrument.

A method for a targeted analysis can for example collect target ions with only slightly different mobility near the top of the electric DC field barrier, just below a lengthy plateau. If there are ion clouds of two target ion species with slightly different ion mobility, the ion species are stored slightly separated in space, the ion species with lower mobility in front of the ion species with higher mobility. The separation depends on the gradient of the electric DC field in this region below the plateau. The electric DC field barrier, including, the plateau is suddenly lowered in a single step so far that both target ion species can just pass the plateau and are thereby separated according to mobility. The constant electric field strength along the plateau is chosen such that the gas flow is just capable of driving the target ions against the electric DC field. Along the plateau, the target ions with lower ion mobility are blown faster by the gas, thus separating from the target ions of higher ion mobility. The full process is such that the ions of lower mobility have a better start position and a higher drift velocity.

A further improvement of the method comprises using a fast ion gate which is located downstream of the TIMS instrument and is capable of cutting off (i.e., deselecting) target ion species, in particular those target ion species of higher mobilities. Any known ion gate principle may be used, e.g., a Bradbury-Nielsen gate, Tyndal gate or ion optic for eliminating unwanted ion species by deflecting them out of the ion path. In an optimal case, the gate is a storing gate, capable of storing the ions for later analysis by the mass spectrometer.

The method can be further optimized by shaping the gradient at the trapping positions of the target ions below the plateau and by enlarging the length of the plateau.

A mass spectrometric system for performing the new methods can, for example, comprise an ion source, a trapped ion mobility separator, a quadrupole mass filter, a fragmentation cell and a time-of-flight (TOF) mass analyzer, in particular a TOF analyzer with orthogonal injection of ions. The system preferably comprises an ion gate between the trapped ion mobility separator and the mass analyzer. The ion gate is preferably capable of storing ions for later analysis. The system can additionally comprise a mass filter between the ion source and the trapped ion mobility separator. Such a mass filter may be operated to select only ions of a targeted mass range, thereby drastically reducing the space charge effects of non-target ions within the TIMS instrument. Alternatively, the time-of-flight analyzer can be replaced with any known type of mass analyzer.

Mathematical simulations and experimental results indicate that ion mobility resolutions of up to $R_{mob}=1000$ are possible. Therefore, the method is very promising.

Figure 1:
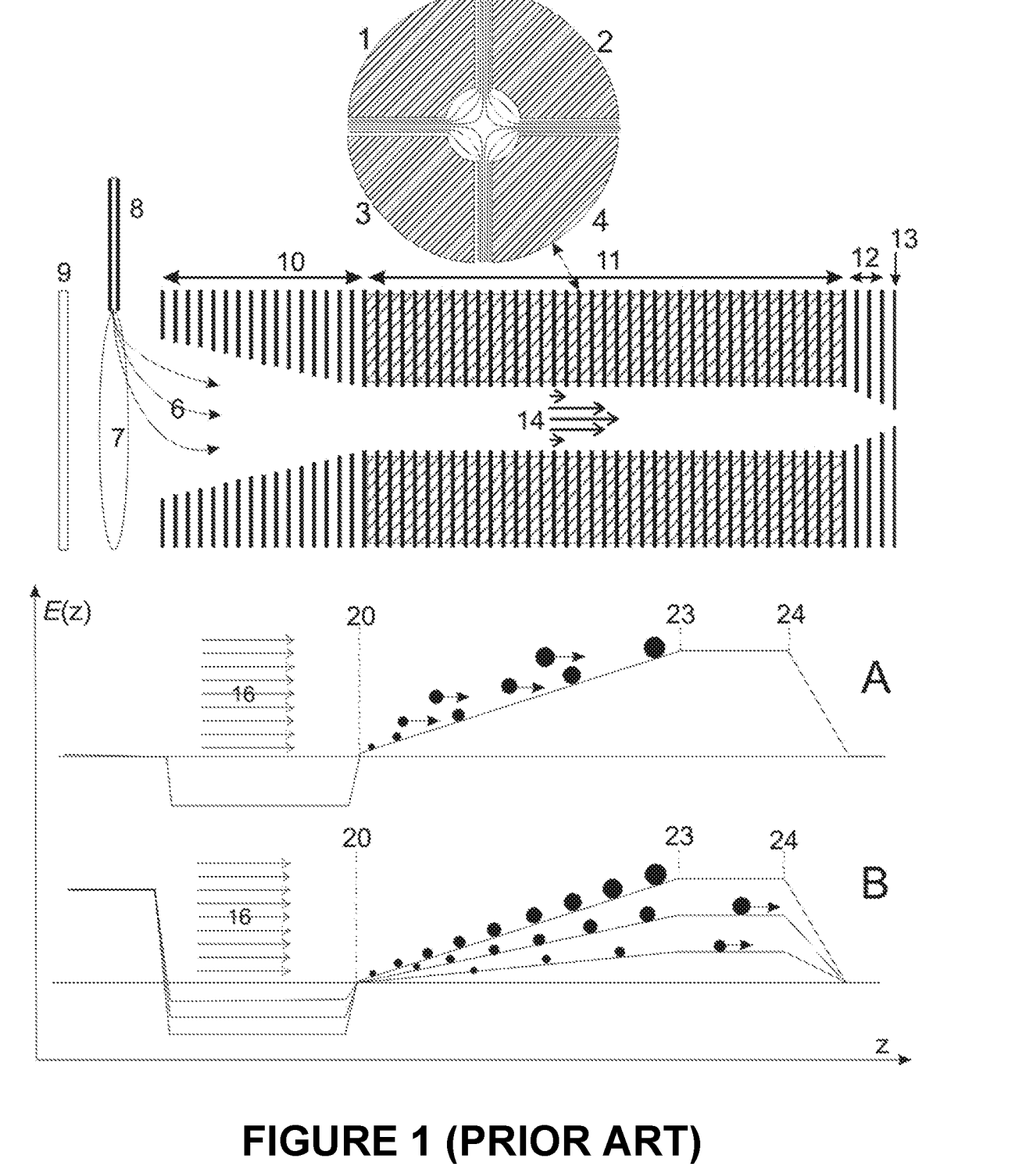

FIG. 1 shows a common operation of a trapped ion mobility separator (TIMS). Entrained by a gas (7), ions from an electrospray ion source (not shown) are introduced via capillary (8) into the first chamber of a vacuum system. A repeller plate (9) drives the ions (6) into the entrance RF funnel (10) of the TIMS. The entrance RF funnel (10) guides the ions into the tube (11) forming a quadrupolar RF tunnel. The quadrupolar RF tunnel (11) comprises a stack of thin electrodes with central holes which form a circular tube arranged around the z-axis of the device. The thin electrodes are separated by insulating material closing the gaps between the electrodes around the tube enabling the creation of a DC electric field profile inside the tube (11). The electrodes of the quadrupolar RF tunnel (11) are segmented into quadrants (1, 2, 3, 4), to allow for the generation of a radial quadrupolar electric RF field inside, keeping the ions near to the axis. Inside the quadrupolar RF tunnel (11), the ions are blown by the gas flow (14) against the ramp of an axial electric DC field barrier. In the bottom part of FIG. 1, two phases A and B of the profile of the electric DC field barrier are shown. The arrows (16) symbolically show the gas flow, driving the ions through the device and up the ramp of the electric DC field barrier; the strength of the gas flow corresponds to the maximum gas flow of the gas flow profile (14). The operation starts with an "ion accumulation phase" (field diagram A). The ions are blown by the gas flow against the ramp of the electric DC field barrier and are stopped there because they cannot surmount the electric DC field barrier. The ions are accumulated on the rising edge of the electric field between locations (20) and (23), where ions of low mobility (mainly heavy ions of large collision cross section) are collected in the high field near the upper end of the ramp, whereas ions of high mobility gather in the low field near the foot of the ramp, as indicated by the size of the dots symbolizing the size of the ions inside the ion clouds. In a second phase (field diagram B), the "scan phase", the supply voltage for the electric DC field barrier is steadily decreased, and ions of increasing mobility can escape successively towards an ion detector, particularly to a mass spectrometer operating as ion detector.

Figure 2:
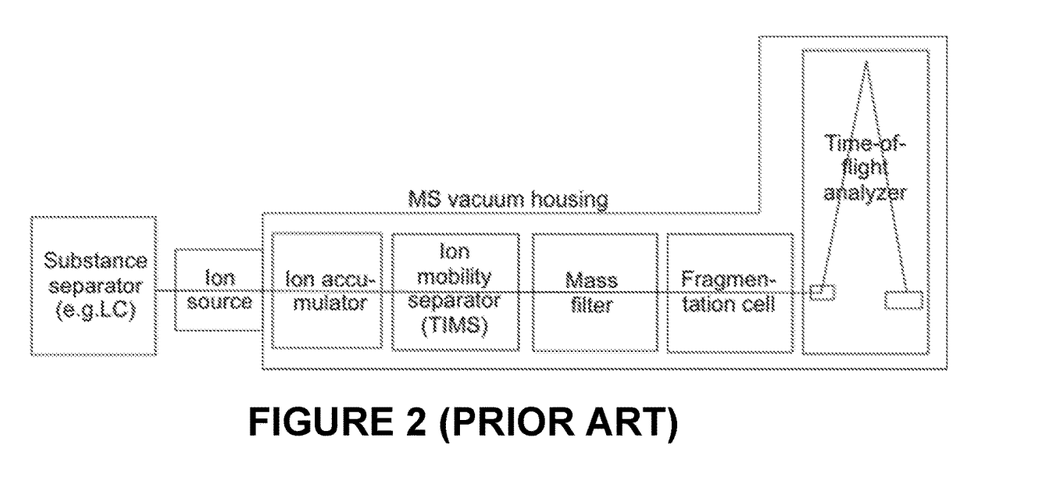
FIG. 2 shows a schematic overview of a state-of-the-art LC-TIMS-MS-MS mass spectrometer with an ion accumulator and TIMS as the ion mobility separator.

FIG. 2 shows a schematic overview of a state-of-the-art LC-TIMS-MS-MS mass spectrometer with an ion accumulator and TIMS as the ion mobility separator.

Figure 3:
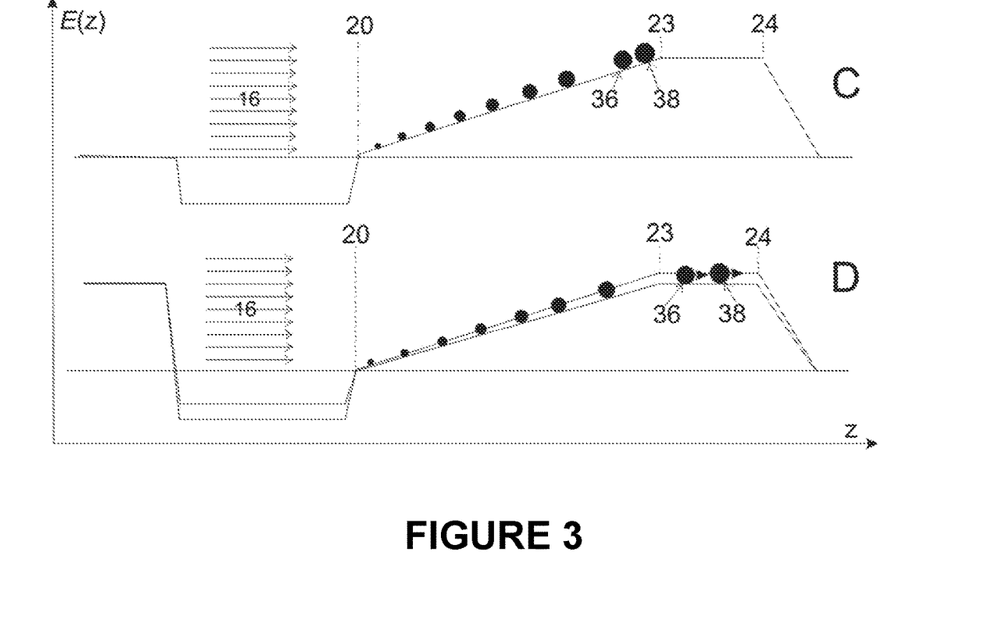
FIG. 3 shows the operation of a TIMS according to one embodiment. Diagrams C and D of FIG. 3 correspond to diagrams A and B of FIG. 1. By setting the DC voltage generating the electric DC field profile, the target ion species (36) and (38), whose mobilities are only slightly different, are collected just below the plateau of the electric DC field barrier, as shown in diagram C. A small reduction of the DC voltage releases the ion species (36) and (38), with the ion species (38) of lower mobility in front.

FIG. 3 shows an operating example of the TIMS for an improved targeted analysis using the TIMS-Q-OTOF of FIG. 2.

The target ion species (36) and (38) have ion mobilities that are close in value. The applied DC voltages are adjusted such that the target ion species (36) and (38) are now collected in the region of the electric DC field barrier just below the plateau which ranges from location (23) to location (24), as shown in diagram C of FIG. 3. The plateau is a region with constant electric DC field. By stepping down the height of the electric DC field barrier a little bit (lowering the strength of the electric DC field at the plateau), only the target ion species (36) and (38) are released, as shown in diagram D of FIG. 3, and start to drift along the plateau, driven by the gas flow which is symbolically indicated by arrows (16). The other ion species stay trapped at the ramp of the electric DC field barrier. The target ion species (36) and (38) are separated as they pass along the plateau because the target ion species (38) of lower mobility has a slightly better start position and will have a slightly higher velocity along the plateau because of higher friction in the flowing gas. The target ion species (38) will arrive first in at the mass analyzer and will be analyzed first with respect to quantity and correct identity. The target ion species may be fragmented in the fragmentation cell and the fragmentation spectrum may be measured in the usual way to confirm the measurement of the mobility species.

Figure 4:
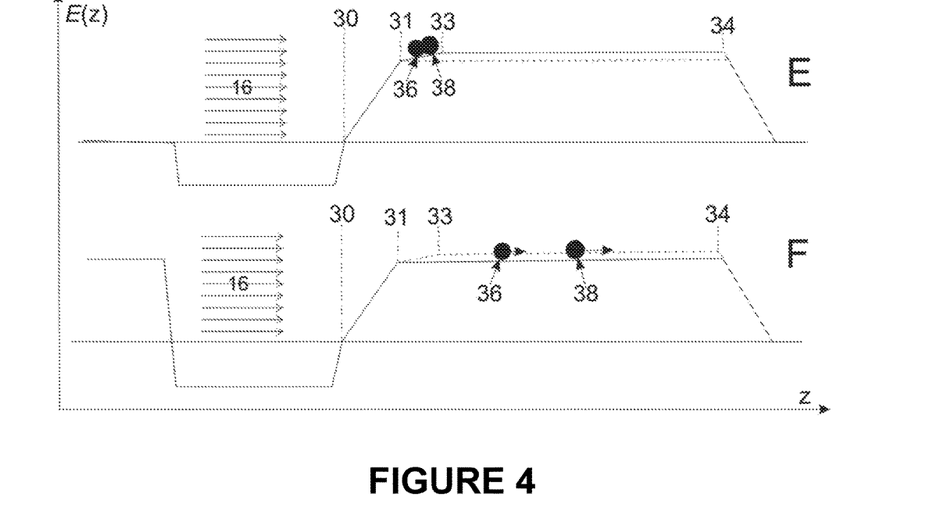

FIG. 4 shows a preferred embodiment with an optimized electric DC field barrier. Compared to FIG. 3, the plateau between locations (33) and (34) is elongated to have a longer drift region. The ramp of the electric DC field barrier is shortened correspondingly, but a small part of the ramp between locations (31) and (33) is formed to show a very flat field gradient. The target ion species (36) and (38) are collected at this flat gradient part of the ramp and then released by lowering of the height of the electric DC field barrier in a single step. Again, the target ion species (38) with a slightly lower mobility move in front of the target ions species (36) because of a better start position and a slightly higher friction within the gas flow, symbolically indicated by the arrows (16). All the other ions of higher mobility (typically ions of lighter masses—not shown in FIG. 4) remain at the ramp between positions (30) and (31).

Figure 5:
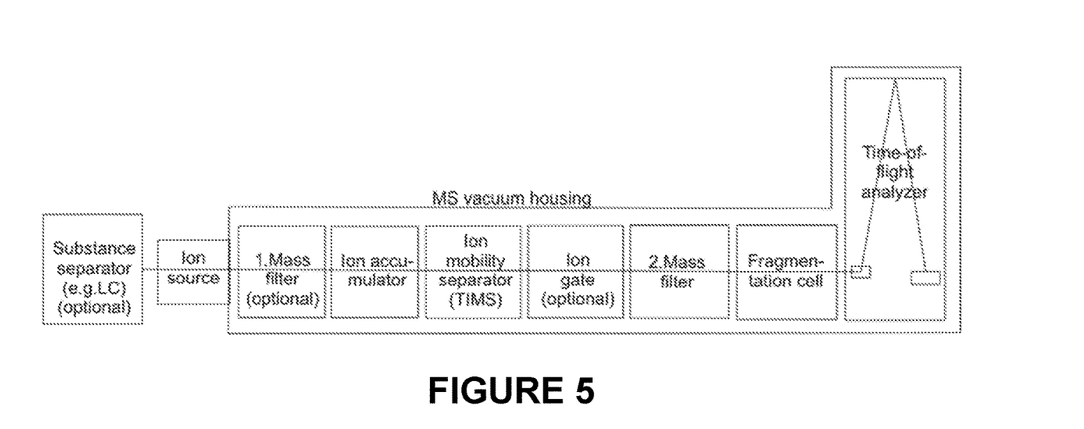
FIG. 5 shows how the LC-TIMS-MS-MS mass spectrometer may be improved for the operation by insertion of a first mass filter before the TIMS and/or an ion gate behind the TIMS. The additional mass filter may be used to select only ions with masses of the targeted mobility species to reduce the space charge within TIMS, and the ion gate may be used to completely separate the targeted mobility ions. The appearance of only the two ion species (36) and (38) in FIG. 4 may be the effect of a first mass filter before the TIMS.

In another embodiment, an additional mass filter and/or an ion gate are optionally inserted in front of the TIMS instrument as indicated in FIG. 5.

The mass filter is capable of selecting only the target ions according to their mass, whereas all other ions are filtered out to reduce the space charge effects within the TIMS. In alternate embodiments, the mass filter may be replaced with other types of ion selectors. For example, a lower resolution TIMS can be used in place of the mass filter to limit the range of mobilities of ions for the targeted analysis.

The ion gate is inserted downstream of the TIMS instrument. The ion gate can be used to prevent some target ion species from proceeding (e.g., ion species (36)), allowing for an undisturbed analysis of a selected target ion species (e.g., ion species (38) by acquiring a mass spectrum and/or a fragment mass spectrum.

An ion gate downstream of a drift type ion mobility separator is disclosed in European Patent No. 2325865 B1 (D. E. Clemmer, 2002).

Figure 6:
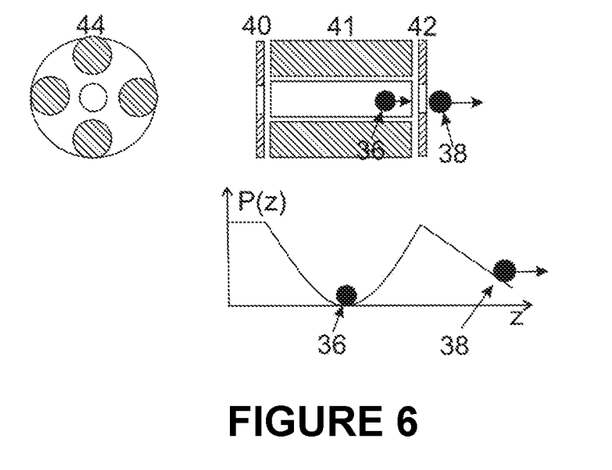

FIG. 6 shows an embodiment for a preferred storing ion gate, comprising a short RF quadrupole system (41) enclosed by two apertured ring electrodes (40) and (42). A cross section (44) of the gate is shown on the left of FIG. 6. Two target ion species (ion clouds) (36) and (38) are just passing the gate, not yet hindered by any DC potential at the ring electrodes. In the moment when the first ion cloud (38) is leaving the gate, DC potentials at the ring electrodes are switched on to keep the second ion cloud (36) inside the gate. In the bottom part of the figure, the potential along the axis z of the storing ion gate is presented, keeping the ion cloud (36) within the storing gate. After finishing the analysis of cloud (38) in the mass spectrometer, the ion cloud (36) may be sent into the mass spectrometer by applying suitable potentials to the ring electrodes.

Figure 7A:
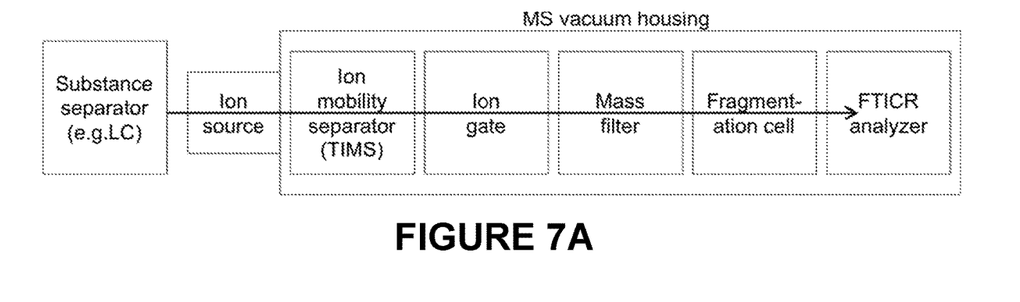
FIG. 7A shows an embodiment comprising a TIMS analyzer, an ion gate, a mass filter, a fragmentation cell, and a Fourier transform ion cyclotron resonance (FTICR) mass analyzer.
Figure 7B:
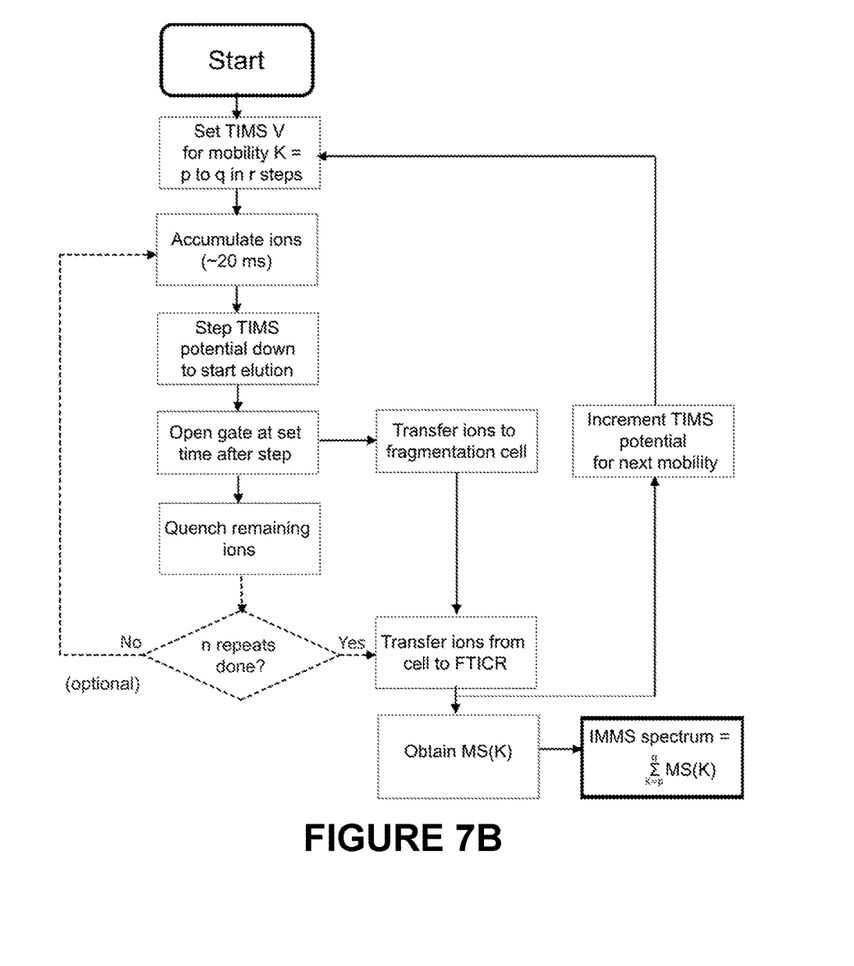
FIG. 7B shows a flowchart depicting a method of operation of the instrument described with reference to FIG. 7A.
Figure 7C:
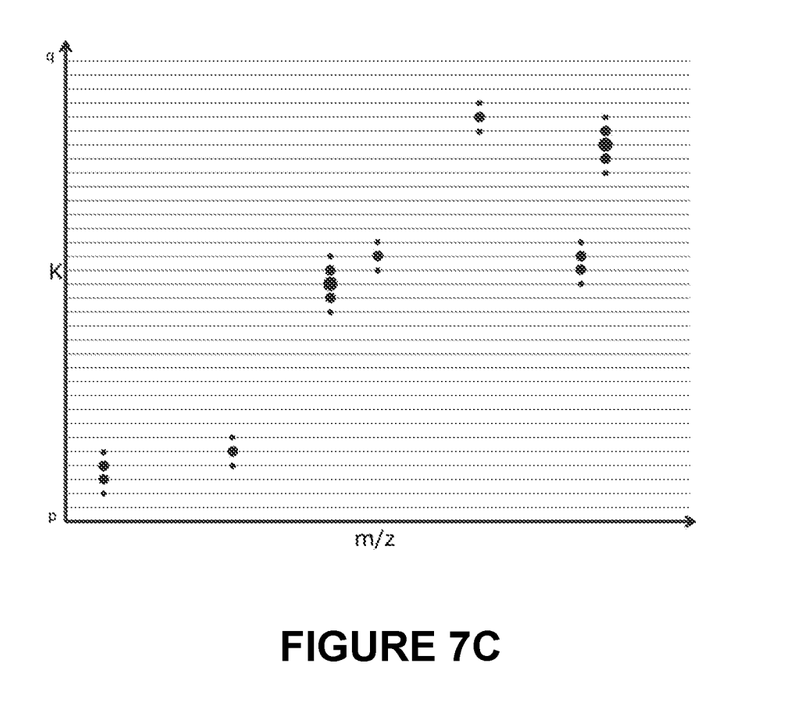
FIG. 7C shows an ion mobility mass spectrum (IMMS) resulting from the combination into an array of the mass spectra produced by the method described with reference to FIG. 7B.

FIGS. 7A to 7C show an instrumental embodiment and a method for its operation.

FIG. 7A shows a mass spectrometric system comprising a TIMS separator, an ion gate, a mass filter, a fragmentation cell, and a Fourier transform ion cyclotron resonance (FTICR) mass analyzer. In further alternate embodiments, another mass filter can be located upstream of the TIMS analyzer and/or an ion accumulator can be located downstream of the TIMS separator, in particular between the TIMS analyzer and the mass filter. In further alternate embodiments, the FTICR mass analyzer may be replaced with any other known mass analyzer including a time-of-flight mass analyzer, a Paul trap, a Kingdon trap (a.k.a. orbitrap), a cassini trap, or a quadrupole analyzer. The ion gate may consist of any known prior art ion gating device including a Bradbury-Nielson gate or a Tyndall gate. The fragmentation cell (also known as a collision cell) may consist of an RF multipole having DC lens elements at its entrance and exit ends and may include a housing so as to confine a collision gas therein.

During operation, analytes elute from the substance separator, are ionized by the ion source, and injected, as analyte ions, into the MS vacuum housing. The remainder of the instrument of FIG. 7A may be operated according to the flowchart shown in FIG. 7B. At first, the electric DC field strength at the plateau of the TIMS analyzer is set by applying electric DC potentials across the TIMS analyzer. This electric DC field strength is slightly above that required to retain ions having a mobility of "p". Ions from the ion source are then accumulated in the TIMS trap for a predetermined period—e.g., 20 milliseconds. During this accumulation period, ions of lower mobility than "p" are pushed by the gas flow over the plateau of the electric DC field barrier and eliminated by the downstream ion gate. After ion accumulation, the strength of the electric DC field of the TIMS analyzer is stepped down enough that ions of mobility "p" may now be pushed across the plateau by the gas stream. After a predetermined time, corresponding to the time required for ions of mobility "p" to cross the plateau and arrive at the downstream ion gate, the ion gate is "opened" such that ions may pass the gate and enter the downstream mass filter. This predetermined time may be determined experimentally. After ions of mobility "p" have passed the ion gate, the ion gate is again closed such that any further ions exiting the TIMS separator are eliminated. Ions of mobility "p" may be further selected according to mass in the mass filter (for example, a quadrupole filter) before passing into the fragmentation cell. These ions may be trapped in the fragmentation cell by known prior art methods—for example, via the application of RF and DC potentials to a multipole rod set and lenses at its entrance and exit. Ions remaining in the TIMS analyzer once ions of mobility "p" have been eluted are "quenched"—i.e., eliminated—from the TIMS analyzer by, for example, momentarily turning off the RF applied to the TIMS analyzer. In a favorable embodiment of the method, this process of accumulating and eluting ions of mobility "p" may be repeated many times ("n" times) in order to increase the population of ions trapped in the fragmentation cell. The ions in the fragmentation cell, whether accumulated or not, are transferred to the FTICR analyzer. The FTICR analyzer is then used to obtain a mass spectrum corresponding to ions of mobility "p". The mass spectrum may show ion species of a single mass, or several ion species of different masses with mobilities close in value. Simultaneously, the electric DC potential across the TIMS analyzer is incremented so as to capture ions of the next mobility—i.e., "p+1"—and the process of accumulating and eluting ions is repeated. In this manner, r mass spectra corresponding to mobilities from "p" to "q" at intervals of (p−q)/r steps are obtained. The sum of all "r" mass spectra results in the ion mobility-mass spectrum (IMMS) as depicted in FIG. 7C.

In FIG. 7C, each horizontal line represents a single mass spectrum. The mass spectra are placed in the depicted array according to their mobility. Each dot in the spectrum represents a group of ions. The size of the dot represents the intensity of the group—i.e., the number of ions in the group. Due to diffusion, ions of a given type (i.e., of a given mass and conformation) elute over a range of apparent mobilities. This is represented in FIG. 7C by series of dots arranged vertically adjacent to one another. As represented here, even within an otherwise identical group of ions, differences in starting positions at the beginning of the elution step and differences, due to diffusion, in the time needed for some of the ions, relative to others, to cross the plateau, will result in some ions arriving earlier at the ion gate (FIG. 7A) than others. Thus, when using a sufficiently narrow ion gate, in time, and a sufficiently narrow mobility step between mass spectra, it is possible to observe a distribution of apparent mobilities—also known as mobility peak width—even for an identical group of ions. In keeping with the Nyquist theorem, it is desirable to maintain a gate width and mobility step sufficiently small to produce several such points across any given mobility peak.

The invention has been shown and described above with reference to a number of different embodiments thereof. It will be understood, however, by a person skilled in the art that various aspects or details of the invention may be changed, or various aspects or details of different embodiments may be arbitrarily combined, if practicable, without departing from the scope of the invention. Generally, the foregoing description is for the purpose of illustration only, and not for the purpose of limiting the invention which is defined solely by the appended claims, including any equivalent implementations, as the case may be.

The invention claimed is:

1. A method for analyzing ions according to mobility using a trapping ion mobility separator (TIMS) comprising a gas flow and an electric DC field barrier within an RF ion guide, comprising the steps of:
   a) introducing ions into the trapping ion mobility separator;
   b) pushing the ions by the gas flow against the counteracting electric DC field barrier, wherein a height of the electric DC field barrier and a velocity of the gas flow are set such that multiple target ion species with slightly different ion mobility are trapped slightly separated in space near a plateau of the electric DC field barrier along which an effective force acting on the ions is substantially constant;
   c) adjusting the height of the electric DC field barrier and/or the velocity of the gas flow in a single step such that the target ion species pass the electric DC field barrier; and
   d) separating the target ion species according to mobility in time and selecting a subset of the separated target ion species by switching an ion gate while the subset passes the ion gate, said ion gate being located downstream of the electric DC field barrier.

2. The method according to claim 1, wherein the target ion species are separated according to mobility in time along the plateau, at which a reduced, substantially constant effective force acts on the target ion species after the adjusting step.

3. The method according to claim 2, further comprising repeating steps (a)-(d) and storing the repeatedly selected subset ions in an ion trap located downstream of the ion gate.

4. The method according to claim 3, further comprising acquiring a mass spectrum and/or at least one fragment mass spectrum of the repeatedly selected subset ions.

5. The method according to claim 2, further comprising acquiring a mass spectrum and/or at least one fragment mass spectrum of the selected subset ions.

6. The method according to claim 1, wherein the selected subset ions arrive at the ion gate prior to any unselected target ions.

7. The method according to claim 1, wherein the gradient of the electric DC field at the trapping position of the target ions near the plateau of the electric DC field barrier is lower than the gradient at the upstream positions of the electric DC field barrier.

8. A mass spectrometric system comprising:
an ion source;
a trapping ion mobility separator (TIMS) comprising a gas flow and a counteracting electric DC field barrier both of which are located inside an RF ion guide;
a mass analyzer, and
an ion gate located between the TIMS and the mass analyzer,
wherein the electric DC field barrier comprises a plateau along which the effective force acting on the ions is substantially constant and the system is configured
to adjust a height of the electric DC field barrier and/or a velocity of the gas flow in a single step such that multiple target ion species with slightly different ion mobility pass the electric DC field barrier,
to separate the target ion species according to mobility in time and select a subset of the target ion species by switching the ion gate while the subset passes the ion gate.

9. The mass spectrometric system according to claim 8, further comprising a fragmentation cell located between the ion gate and the mass analyzer.

10. The mass spectrometric system according to claim 8, further comprising an ion trap between the ion gate and the mass analyzer.

11. A method for analyzing ions according to mobility using a trapping ion mobility separator (TIMS) comprising a gas flow and a counteracting electric DC field, wherein an effective force induced by the gas flow and the electric DC field has a gradient along an axis of the TIMS in a first ramp region of the TIMS and is substantially constant along a second, downstream plateau region of the TIMS (plateau), comprising the steps of:
introducing ions into the TIMS wherein the strength of the electric DC field and the velocity of the gas flow are set such that multiple target ion species with slightly different ion mobility are axially trapped near the plateau;
adjusting the strength of the electric DC field and/or the velocity of the gas flow in a single step such that the target ion species are no longer trapped near the plateau; and
separating the target ion species according to mobility in time and selecting a subset of the separated target ion species by switching an ion gate while the subset passes the ion gate, said ion gate being located downstream of the TIMS.

12. The method according to claim 11, wherein the target ion species are separated according to mobility in time along the plateau at which a reduced effective force acts on the target ion species after the adjusting step.

13. The method according to claim 11, wherein a mass spectrum and/or at least one fragment mass spectrum is acquired for the selected subset ions.

14. The method according to claim 4, wherein repeating steps (a)-(d) and storing the repeatedly selected subset ions comprises repeating steps (a)-(d) and storing the repeatedly selected subset ions for target ion species in different ranges of ion mobility.

15. The method according to claim 5, further comprising repeating steps (a)-(d) and acquiring a mass spectrum and/or at least one fragment mass spectrum for subset ions in different ranges of ion mobility.

16. The method according to claim 1, wherein a mobility range $(K_{max}-K_{min})/K$ of the target ion species is smaller than 1/100 wherein $K_{max}$ is a maximum mobility, $K_{min}$ is a minimum mobility and K an average mobility of the target ion species.

17. The method according to claim 1, wherein a duration needed for adjusting the height of the electric DC field barrier and/or the velocity of the gas flow is less than 0.1 ms.

18. The method according to claim 1, wherein a length of the plateau is more than 30% of a length of the electric DC field barrier in a direction of ion travel.

19. The method according to claim 1, wherein a length of the plateau in a direction of ion travel is longer than 1 cm.

20. The method according to claim 1, wherein a length of the plateau in a direction of ion travel is longer than 3 cm.

21. The method according to claim 1, wherein ions that remain at the electric DC field barrier after step (c) are eliminated.

22. The method according to claim 8, wherein ions that remain at the electric DC field barrier after step (c) are eliminated.

* * * * *